Sept. 26, 1950     R. H. MOTH     2,523,666
SWITCH FOR INDICATING FAILURE OF LUBRICATING SYSTEMS
Filed Nov. 8, 1946
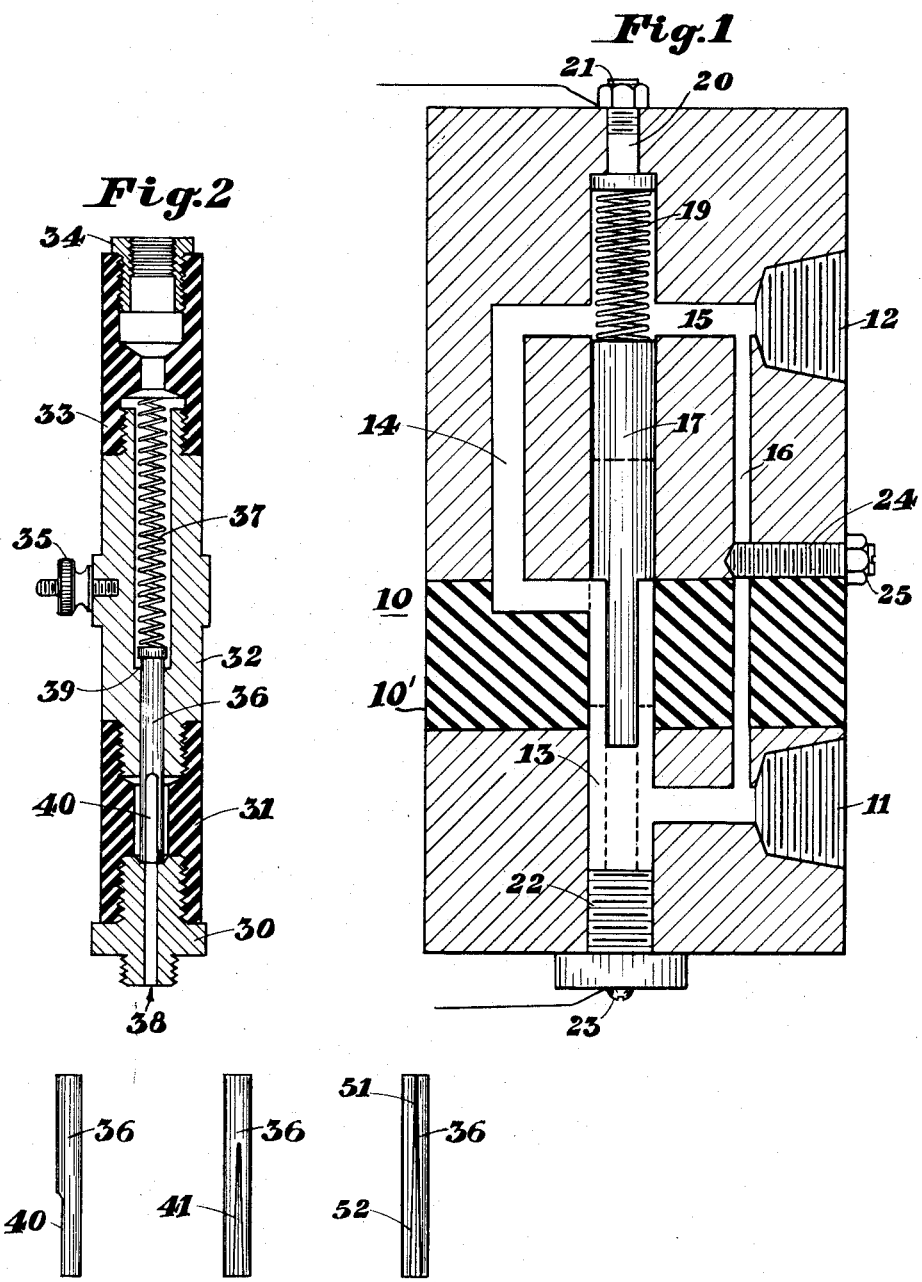
INVENTOR.
Robert H. Moth
BY Edward H. Lang
Attorney Patented Sept. 26, 1950

2,523,666

UNITED STATES PATENT OFFICE 2,523,666

SWITCH FOR INDICATING FAILURE OF LUBRICATING SYSTEMS

Robert H. Moth, Chicago, Ill., assignor to The Pure Oil Company, Chicago, Ill., a corporation of Ohio Application November 8, 1946, Serial No. 708,765

4 Claims. (Cl. 200—82)

This invention relates to prime movers for delivery of motive power, and, more particularly, to a safety device associated with the lubricating systems of such power delivery apparatus.

Pressure lubricating systems in power delivery apparatus or engines of various types are generally either of the steady flow or impulse type. The particular system used will depend, to some degree, on the preference of the designer and the application of the machine. In either case, it is important that some type of control be provided in order that efficient lubrication of the machine be effected. The steady flow type of pressure lubrication is easily controlled for failure is readily detected through loss of pressure. Impulse type lubricating systems, which are characterized by their periodic delivery of a definite quantity of oil, are not easily controlled because of the lack of some steady measurable property which would provide the basis for detection of failure and control.

Accordingly, it is an object of the present invention to provide a safety device for insertion in an oil line which will be responsive to oil failure in a pressure system, whether it be a steady flow or impulse type.

It is a second object of the invention to provide a device which will relate the operation of the lubricating system to an external electrical control system to make the control system responsive to oil failure in the lubricating system.

It is another object of the invention to provide a device which exhibits a controllable time lag between the first failure of oil pressure in the lubricating system and its response, which indicates the failure and activates the external electrical system.

It is a further object of the invention to provide a unitary device which can be easily inserted in an oil line to form a part thereof and thus be located nicely for detection and warning of the failure of the oil pressure.

It is a still further object of the invention to provide a safety device for an impulse type lubricating system, which in its response will distinguish between an occasional accidental failure of the system to deliver a drop of oil and sustained failure of the system to function, upon which it will cut off or short circuit engine ignition.

Other objects and advantages of the invention will in part be obvious and in part appear hereinafter.

The invention, accordingly, comprises a device for incorporation into the lubricating system of an engine, by means of which failure of the latter can be externally indicated or made to interrupt operation of the engine, the device having the features of construction, combinations of elements and arrangements of parts which will be described in detail hereinafter.

The principles involved in the construction and operation of the device and relationship of the several elements to each other and the whole combination will be more easily understood by consideration of the drawings, together with the detailed description thereof. In the drawings, Figure 1 represents a longitudinal section through one form of the apparatus;

Figure 2 similarly represents a longitudinal section through an alternative form of the apparatus;

Figure 3 is a detailed drawing of the plunger shown in the alternative form comprising Figure 2;

Figures 4 and 5 illustrate alternative forms of the plunger.

Referring to Figure 1 of the drawings for a detailed understanding of the structure and relationship of parts of the basic form of the apparatus, 10 represents the body, with a midsection 10' made of electrically insulating material, having oil inlet 11 through which oil is pumped, and outlet 12 through which oil passes to the mechanism to be lubricated. The course of the oil through the apparatus is from inlet 11, through conduits 13, 14, and 15 to exit 12. A by-pass 16 provides for limited fluid communication between conduits 13 and 15 in the body of the apparatus for the purpose of controlling the pressure responsiveness of the apparatus as will be described in more detail below. Plunger 17 serves as a pressure regulated valve and electrical contact controlling communication between conduits 13 and 15 via 14, and is closely fitted, like the piston of a cylinder, in conduit 13. Exerting force in opposition to the hydraulic force of the oil exerted on plunger 17, is spring 19 which makes contact with closure 20 and electrical contact 21. The opposite end of conduit 13 is closed by closure 22 and contact 23.

The amount of oil by-passed from passage 13 to 15 is controlled by adjustment of screw 24 and nut 25 by means of which restriction can be placed in the passage 16.

Complete electrical connection for creation of an electrical signal and activation of an external electrical circuit upon failure of oil pressure is made from contact 21 through spring 19, plunger 17, closure 22 and contact 23. It is understood that in order to make possible the electrical isolation of contact 21 from 23 some intermediate portion or all of the body 10 of the apparatus must be made of insulating material.

Prior to starting operation of the engine, plunger 17 is in a lowered position in contact with 22, as indicated by dotted lines to make a complete electrical path between contacts 21 and 23. Upon starting the engine oil pressure will lift the plunger to a level about corresponding to that shown in the figure, whereupon the oil passage through 13, 14 and 15 is clear and unobstructed for oil to flow through 12 to the mechanism to be lubricated. Plunger 17 is so closely fitted to passage 13 that the several impulses delivering discrete drops of oil, in an impulse lubricating system, through the channels will be separated by time intervals insufficient to permit the plunger to drop back into electrical contacting position with contact 22 between impulses. Thus, when the lubricating system of the engine is in operative condition, the plunger 17 is maintained in elevated position on open electrical circuit and the course of the oil is through conduits 13, 14 and 15, with a small amount by-passed through passage 16. Should a defect in the lubricating system result in loss of oil pressure, and thereby failure of delivery of pulses of oil, cylinder 17 will be slowly forced back toward electrical contacting position with contact 22 under the urging of spring 19, and oil will be gradually forced out of passage 13 through by-pass 16. This small flow of oil through the by-pass will be sufficient to prevent damage to the machine being lubricated. By regulation of the amount of constriction placed in the by-pass 16 with screw 24, the time lag between initial failure of the system to deliver oil through inlet 11 and the time of external indication can be precisely controlled to cause the device to distinguish between an isolated failure to deliver a drop or two of oil and a true failure of the lubricant pumping system to deliver consistently.

Referring now to Figure 2, there is shown an alternative form of the apparatus which provides also for creation of an electrical signal and activation of an external electrical circuit upon failure of lubricating pressure, and for visual inspection of the oil line during operation. Essentially, the device is built to be placed in the oil line to form a part of the oil conduit and comprises a group of elements arranged in series to provide an oil passage, visual inspection, and a holder for a plunger and spring mechanism which are responsive to the failure of the engine oil pressure. In the drawing the oil passage is shown as being made up of elements comprising bushing 30, cylinder section 31, body section 32, cylinder section 33, and a bushing 34. Electrical connection is made between the body 32 and the bushing 30 by means of connector 35 and plunger 36. For this purpose cylinder members 31 and 33 are made of electrically insulating material. In that fashion an electrical path through the device is provided and the device is electrically insulated from the remainder of the lubricating system. A spring 37 maintains a constant positive pressure against plunger 36 in opposition to oil pressure admitted through passage 38. The spring 37 is mounted within body 32 in its axial cylindrical passage which has a displacement limiting ledge 39 to limit extension of the spring 37 and plunger 36.

Figure 3 shows the plunger 36 in detail to illustrate how a portion of the cylindrical body is cut away to form a plateau 40 and make the lower section of the plunger of smaller cross-sectional area than the upper cylindrical section. The plunger is shown as being circular in cross-section, but it is clear that it could be of square cross-section, or any other geometrical form, and still perform its function adequately. Plunger 36 is relatively loosely fitted into its passage in body member 32 so that the annular clearance between the plunger and the cylinder wall will serve as an oil by-pass in a fashion to be described in detail below.

In Figure 4 there is shown an alternative form of plunger which differs from that shown in Figure 3 by having a tapered groove 41 in its body and extending through a substantial part of its length. By so constructing the plunger the effect of a graduated flow of oil proportional to the oil pressure can be had.

Figure 5 illustrates another alternative form of plunger 36 which is made to fit closely in the cylindrical body 32 and provides for by-pass of oil by means of a fine groove 51 in its upper portion and for normal flow of oil by the larger groove 52 in its lower portion.

Referring again to Figure 2, in operation of the oil feeding and controlling device, the course of the oil from the pumping mechanism to the engine is through the passage 38 in bushing 30, through the passage in cylindrical member 31, through the annular clearance between plunger 36 and body 32, past the spring member 37, and through the passages in members 33 and 34, to the mechanism to be lubricated. A small clearance is provided between the body member 32 and the plunger 36 in order that there may be a small by-pass of oil. The passage can be formed by providing a loosely fitting cylinder or by providing a closely fitting cylinder having a longitudinal groove as indicated in the description of alternative forms of the plunger illustrated in Figures 4 and 5. When the oil pressure is applied to the base of plunger 36 by activation of the oil pumping mechanism, the plunger is forced upward against spring 37, and it will be observed that within a controlled period of time, depending upon the exact structure of the plunger and the amount of by-pass allowed, the cut-away portion 40 of the plunger will rise above the ledge 39 in body 32, thereby creating an orifice or aperture to permit a relatively free flow of oil through the device. The clearance between plunger 36 and the wall in body 32 is regulated so that under normal conditions the plunger will be slowly forced back toward electrical contacting position with bushing 30 in a period of time materially longer than the interval separating pulses of oil delivered by the impulse lubricator. In such a fashion the separate pulses of oil delivered will maintain plunger 36 in an elevated position such that an orifice for oil passage will be maintained at ledge 39 and permit passage of the oil pulses. Should a lubricating pump failure occur such that a plurality of pulses of oil fail to be delivered to the mechanism, plunger 36, in the interval, will gradually be forced downward, and, if the number of pulses missed is sufficiently large, the plunger will have opportunity to make electrical contact with bushing 30 and activate such external control circuit as may be employed. It is readily understood that the particular balance between the time lag allowed between initial failure of the oil pumping system and external signal is a matter of choice and variable to suit individual needs, and is established by the ratio between the volume of oil flowing through the main orifice and the amount which is capable of flowing through the by-pass.

Since impulse lubricators commonly deliver a specific number of drops of oil per minute, the time lag allowed for plunger 36 to reach electrical contacting position is conveniently made about a minute. Thus, in a device made to deliver 10 drops of oil per minute, a one minute time lag is obtained by fixing the leakage past plunger 36

(Figure 2) or the flow through the by-pass 16 (Figure 1) at a rate of about 1 or 2 drops per minute.

Operation of the device on a steady flow pressure lubricating system is also possible, for upon sustained failure of oil pressure, plunger 36 will gradually be forced down into electrical contacting position with bushing 30.

Visual inspection of the performance of the lubricating system is provided for by constructing member 31 of transparent material inert to the type of oil being used in the engine. By so doing, it is possible simply by inspection to observe whether or not the end of plunger 36 is visible during the operation of the engine. The steadiness with which the end of the plunger 36 is kept elevated above the transparent plastic section, or the frequency with which it projects into the passage will be an indication of the efficiency of the lubricator.

Thus, it is apparent that the invention provides a sensitive, accurate pressure responsive device for insertion in a lubricating system for interrupting engine ignition upon failure of the lubricating system. It has the distinct advantage of being adaptable to use in either the steady flow or impulse lubricating system and of being adjustable to a variety of pressures and flow rates in either. In an impulse type of lubricator it has the distinct advantage of distinguishing between occasional accidental failure to deliver a pulse of oil and a true material failure of the lubricating system to function.

The exact form which the external electrical circuit will take to furnish the desired signal is variable to suit the requirements of a particular installation. The simplest form indicated is to include the device in the ignition circuit of an internal combustion engine to bring about short circuiting in case of lubricant pressure failure. More elaborate remote signal devices would include the installation of relays to amplify and transmit the signal indicating lubrication failure to a light or bell.

Since certain changes may be made in the device and different forms thereof embodying the invention could be made without departing from the scope thereof, it is intended that all matter contained in the above description or shown in the accompanying drawings shall be interpreted as illustrative and not in a limiting sense.

What is claimed is:

1. A device for use in a pressure lubricating system having oil delivery lines, said device being responsive to failure of the lubricating system to give an external signal comprising, a casing for insertion in the oil line to define a chamber, electrical contacts communicating with said chamber, a plunger movable in said chamber to provide electrical communication between said contacts, said plunger being movable responsively to pressure of lubricating oil and a balancing compression member, means for admitting pressure to said chamber to actuate said movable plunger and maintain it in open circuit position to permit free flow of oil through said chamber, and by-pass means for permitting restricted flow of lubricant past said movable member when it is held in closed circuit position by said compression member said restricted flow of oil being at most about half said free flow.

2. A device for use in a pressure lubricating system having oil delivery lines, said device being responsive to failure of the lubricating system to give an external electrical signal comprising, a casing for insertion in the oil line to define a chamber forming part of the oil path, electrical contacts communicating with said chamber, a movable member in said chamber to bridge the said contacts electrically, said member being movable in said chamber into open circuit position against a balancing compression member responsively to oil pressure, means for admitting oil pressure to said chamber to move said movable connection into and maintain it in open circuit position and to permit free flow of oil through said chamber, and by-pass means for permitting restricted flow of lubricant past said movable member when it is moved into and held in closed circuit position by said compression member said restricted flow of oil being at most about half said free flow.

3. A device for insertion in the lubricant line of a pressure lubricating system, said device being responsive to failure of the lubricating system to deliver a plurality of oil pulses comprising, a casing defining a cylindrical chamber, electrical contacts communicating with said chamber, a matching cylindrical connection movable freely in said chamber responsive to pressure of lubricating oil to provide electrical communication between said contacts, said member being movable in said chamber into open circuit position against a balancing compression member responsively to oil pressure, means for admitting oil to said chamber to actuate said movable connection and maintain it in open circuit position for free flow of oil through said chamber, and by-pass means formed between said movable member and its enclosing chamber for permitting limited flow of lubricant past said movable member when it is in closed circuit position, said by-pass being proportioned to limit flow of oil to less than about half the free flow rate, whereby the movable member under the force of the said compression member will be returned to closed circuit position to indicate failure of the lubricating system.

4. In a device as defined in claim 2, a movable member in combination with a chamber of larger diameter to provide an annular by-pass of limited cross-sectional area, said movable member having a section thereof removed to reduce its cross-sectional area materially over a substantial part of its length to provide a free path for oil when said member is in open circuit position, the relationship of the cross-sectional area of said by-pass path to that of the free flow path being about 1 to 2 at most.

ROBERT H. MOTH.

REFERENCES CITED

The following references are of record in the file of this patent:

UNITED STATES PATENTS

| Number | Name | Date |
|---|---|---|
| 808,929 | Kettering | Jan. 2, 1906 |
| 1,513,361 | Airey | Oct. 28, 1924 |
| 1,659,890 | Nelson | Feb. 21, 1928 |
| 1,900,229 | Dennis | Mar. 7, 1933 |
| 2,033,084 | Rowley | Mar. 3, 1936 |
| 2,059,782 | Ewen | Nov. 3, 1936 |

FOREIGN PATENTS

| Number | Country | Date |
|---|---|---|
| 381,735 | Germany | Sept. 24, 1923 |
| 670,807 | France | Apr. 24, 1929 |